US006072673A

United States Patent [19]

Chen et al.

[11] Patent Number: 6,072,673

[45] Date of Patent: Jun. 6, 2000

[54] MEDIUM TO HIGH VOLTAGE LOAD CIRCUIT INTERRUPTERS INCLUDING METAL RESISTORS HAVING A POSITIVE TEMPERATURE COEFFICIENT OF RESISTIVITY (PTC ELEMENTS)

[75] Inventors: William W. Chen, Marion, Iowa; Eldridge Byron, Murfreesboro, Tenn.; Stanley J. Brooks, Rockvale, Tenn.; Lori Dorrell, Nashville, Tenn.; Gary W. Scott, Mount Vernon, Iowa

[73] Assignee: Square D Company, Palatine, Ill.

[21] Appl. No.: 09/196,366

[22] Filed: Nov. 19, 1998

[51] Int. Cl.[7] .................... H02H 3/00

[52] U.S. Cl. .................... 361/9; 361/13; 361/14

[58] Field of Search .................... 361/3, 5, 8, 9–14

[56] References Cited

U.S. PATENT DOCUMENTS

| | | | |
|---|---|---|---|
| 4,070,641 | 1/1978 | Khalid | 338/61 |
| 5,424,504 | 6/1995 | Tanaka et al. | 218/78 |
| 5,629,658 | 5/1997 | Chen | 335/201 |
| 5,737,160 | 4/1998 | Duffy | 361/3 |
| 5,805,393 | 9/1998 | Thomas | 361/6 |

*Primary Examiner*—Michael J. Sherry

*Attorney, Agent, or Firm*—Kareem M. Irfan; Larry I. Golden

[57] ABSTRACT

A medium to high voltage load circuit interrupter and method for breaking the flow of electric current in a line having a load and a source. A main switch is connected in series with the line. A metal resistor having a positive temperature coefficient of resistivity (PTC element) is connected in series to the arcing switch, wherein the metal resistor and arcing switch are connected in parallel with the main switch. The main switch moves from the closed position to the open position prior to the arcing switch moving from the closed position to the open position. The circuit interrupter further includes an arc chute having a channel and electrically coupled to the arcing switch wherein the arcing switch is positioned within the channel when the arcing switch is in a closed position. In one embodiment, the PTC element is positioned on an insulator positioned between a ground and the main switch and an arcing switch. In another embodiment, the PTC element is positioned within a channel in the arc chute. The PTC element is, for example, in the shape of a serpentine, and is comprised, for example, of a pure metal such as pure tungsten, iron, tantalum or chromium.

30 Claims, 11 Drawing Sheets

MEDIUM TO HIGH VOLTAGE LOAD CIRCUIT INTERRUPTERS INCLUDING METAL RESISTORS HAVING A POSITIVE TEMPERATURE COEFFICIENT OF RESISTIVITY (PTC ELEMENTS)

BACKGROUND OF THE INVENTION

1. Field of the Invention

The invention relates to the use of medium to high voltage load interrupter switches or circuit interrupters with metal resistors having a positive temperature coefficient of resistivity (PTC elements).

2. Background of the Art

Circuit breakers and circuit interrupters or interrupter switches are widely used in residential and industrial applications for the interruption of electrical current in power lines upon conditions of severe overcurrent caused by short circuits or by ground faults. One of the problems associated with the process of interruption and breaking of the current during severe overcurrent conditions is arcing. Arcing occurs between the contacts of circuit interrupters used to break the flow of electric current in a line, which is highly undesirable for several reasons. Arcing causes deterioration of the contacts or blades of the circuit interrupter and causes gas pressure to build up. Arcing also necessitates circuit interrupters with larger separation between the contacts in the open position to ensure that the arc does not persist with the contacts in the fully open position.

Prior art devices have used a number of approaches to limit the occurrence of arcing. In heavy-duty interrupter switches, the contacts may be enclosed in a vacuum or in an atmosphere of $SF_6$. Both of these approaches are expensive and, $SF_6$ has been identified as environmentally undesirable.

Another approach that has been used to limit the amount of arcing is the use of a resistor connected in parallel with the main contacts of the circuit interrupter. Upon opening of the main contacts, current can still flow through the shunt resistor, effectively reducing the amount of arcing in the main contacts. The current flowing through the resistor is less than the short circuit current that would flow through the main contacts in the absence of the resistor, and the opening of a second pair of contacts connected in series with the resistor can be accomplished with less arcing than would occur in the absence of the shunt resistor.

Tanaka et al., (U.S. Pat. No. 5,424,504), teach a circuit breaker in which a resistor-provided UHV breaker has a tank sealing an insulating gas, a main contact and a resistor unit connected in parallel to the main contacts also located in the tank. Mechanisms are provided so that the resistor contact is made before and broken after the main contact is made and broken. The resistor has to be rated to withstand the high currents and temperatures during short circuit conditions.

Khalid, (U.S. Pat. No. 4,070,641), teaches a current limiting circuit breaker in which the current limiting contacts are in series with the main contacts of a breaker. Opening of the limiting contacts shunts high fault current through the resistor. The resistor is an iron wire resistor with a positive temperature coefficient of resistance. The flow of the short circuit current through the resistor heats the resistor, thereby increasing its resistance and limiting the buildup of the short circuit current.

Chen (U.S. Pat. No. 5,629,658) discloses a number of devices in which PTC elements are used in conjunction with two or more switches to limit the current under short circuit conditions and thereby reduce the associated arcing.

The present invention achieves the breaking of an electric current in a line with a reduction in arcing, noise and gas venting. The circuit interrupter and method of the present invention increases the switching capacity for a high voltage load circuit interrupter especially for inductive circuits with a power factor lower than 25%. The present invention reduces the time for breaking the flow of electric current by increasing the arcing blade path resistance and the power factor of the circuit while also reducing the cost of the circuit interrupter.

SUMMARY OF THE INVENTION

The present invention provides a circuit interrupter and method for breaking the flow of electric current in a line having a load and a source wherein the circuit interrupter is a medium to high voltage load circuit interrupter. A main switch, having an open and a closed position, is connected in series with the line. An arc chute having a channel is electrically coupled to an arcing switch, having an open and a closed position, wherein the arcing switch is positioned within the channel when the arcing switch is in the closed position. A metal resistor having a positive temperature coefficient of resistivity (a PTC element) is connected in series with the arcing switch and the PTC element and arcing switch are connected in parallel with the main switch. The main switch moves from the closed position to the open position prior to the arcing switch moving from the closed position to the open position.

In one embodiment, the PTC element is connected to a source terminal and to the arcing switch through the arc chute. In another embodiment, a flexible connector is connected to the arcing switch and the PTC element is connected to a load terminal and to the arcing switch through the flexible connector.

In the circuit interrupter of the present invention, an insulator is positioned between a ground and the main switch and the arcing switch and in one embodiment the PTC element is positioned on the insulator. The PTC element preferably has a serpentine shape and, in one embodiment, is embedded within the insulator, in another, is wrapped circumferentially around the insulator, and in still another is wrapped longitudinally around the insulator.

Another embodiment of the present invention includes the PTC element positioned on the arc chute within the channel of the arc chute. A first terminal end of the PTC element is connected to the source terminal and a second terminal end of the PTC element is connected to the arcing switch through the arc chute. Alternatively, the first terminal end of the PTC element is connected to both the source terminal and the arcing switch through the arc chute, and the second terminal end of the PTC element is also connected to the arcing switch through the arc chute.

In each embodiment, the PTC element is preferably comprised of a pure metal such as pure tungsten, iron, tantalum or chromium, and is in the shape of a metal wire, rod or foil.

Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, reference should be made to the following detailed description of the preferred embodiment, taken in conjunction with the accompanying drawings, in which like elements have been given like numerals.

DETAILED DESCRIPTION OF PREFERRED EMBODIMENTS

Figure 1:
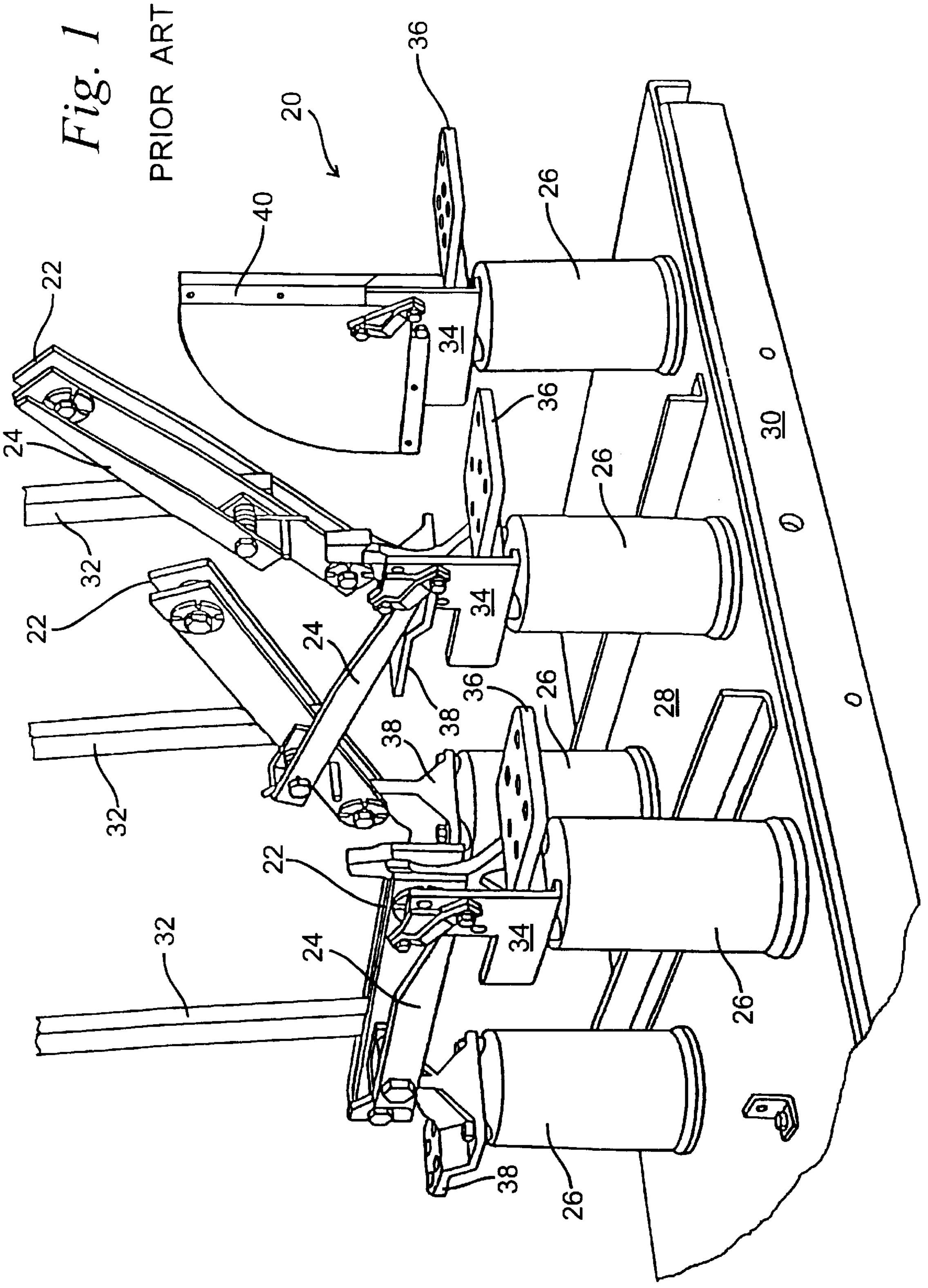
Fig. 1 PRIOR ART
FIG. 1 (prior art) is a partial perspective view of a high voltage switchgear having a main blade and an arcing blade.

FIG. 1 (prior art) is a partial perspective view of a multiphase high voltage load (HVL) switch or circuit interrupter 20 having a main blade 22 and an arcing blade 24. The prior art circuit interrupter is a three-phase current interrupter. In each phase, there is a main blade 22 (a main switch) having an open position and a closed position, and an arcing blade 24 (an arcing switch) having an open position and a closed position. All electrically live parts of the HVL circuit interrupter 20 are mounted on insulators 26 attached to a grounded sheet metal 28 of an HVL circuit interrupter enclosure 30. A pull-bar 32 is connected to each main blade 22 for facilitating the operation of the main blade 22.

The HVL circuit interrupter 20 breaks the flow of electrical current in a line (not shown in this figure) having a load and a source wherein the HVL circuit interrupter 20 is connected to a source terminal 36 for each phase and a load terminal 38 for each phase. The source terminal 36 and the load terminal 38 are shown having a number of holes or apertures for connecting the cables or wires from the line source and the line load, respectively. An arc chute 40 and arc chute terminal 34 are connected to the insulator 26 for each phase. The entire arc chute 40 is illustrated only on one phase of the HVL circuit interrupter 20 for simplicity. The arc chute 40 includes a channel in which the arcing blade 24 is positioned when the arcing blade 24 is in the closed position. The arc chute 40 also includes an insulating material on the outside and arc stacks such as steel plates on the inside of the arc chute 40. The arc chute 34 is electrically separated from the source terminal 36 in FIG. 1.

During the breaking operation, the main blade 22 completely disconnects and transfers current to an arcing path in the arc chute 40. The arc is forced to travel through the arc chute 40, where it is extinguished. Nearly all the interruption energy is consumed through generating arcing in the prior art HVL circuit interrupter 20 shown in FIG. 1. Because approximately 100% interruption energy goes to arcing, the interruption capacity of the prior art HVL circuit interrupter 20 is very limited, especially for inductive circuits with a power factor less than 25%. For example, the prior art HVL circuit interrupter 20 can only interrupt a 15 KV circuit with current slightly over 650 A at a power factor of 20% and can not interrupt a 15 KV circuit with a 2,100 A current.

Figure 2:
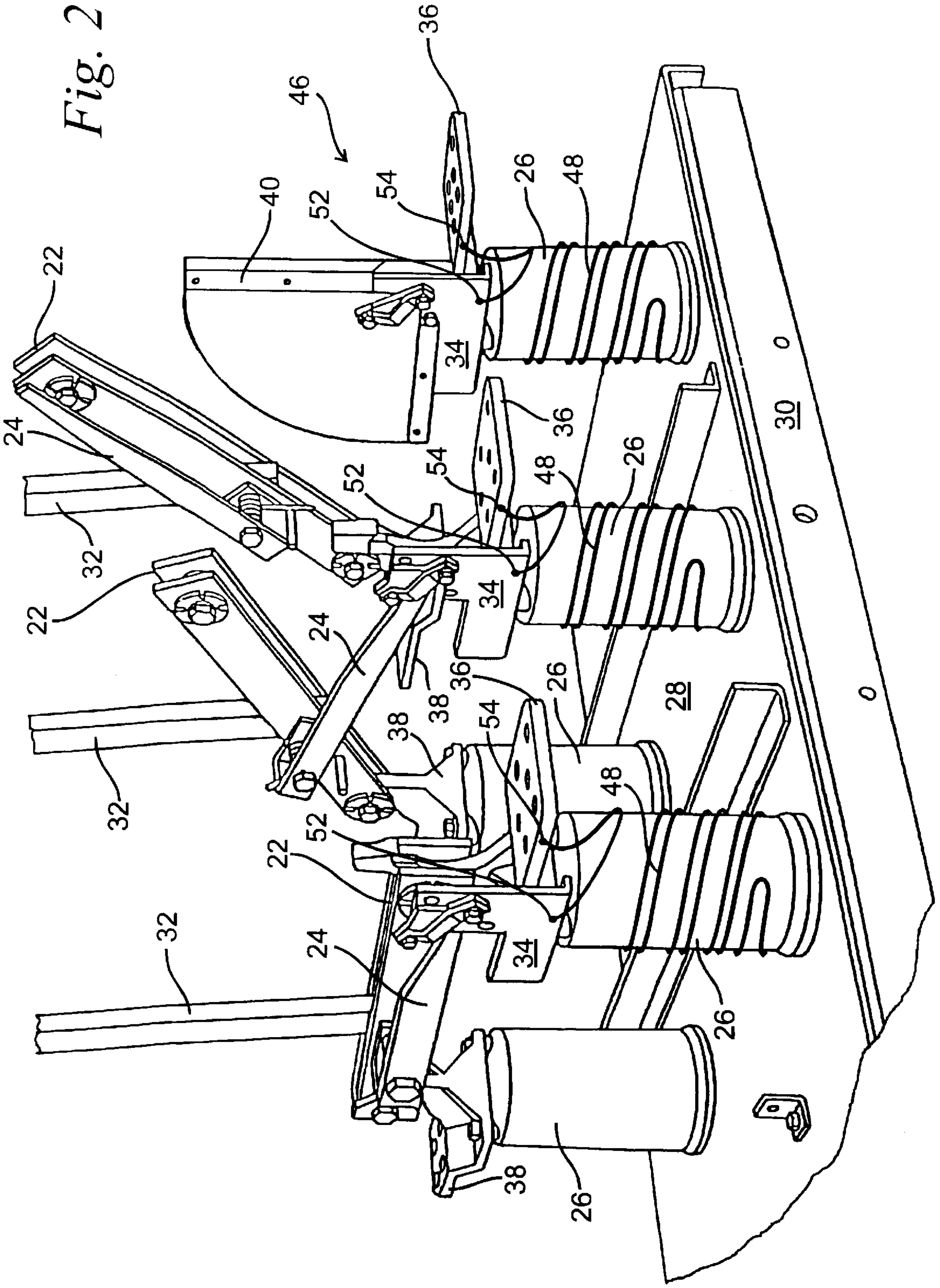
FIG. 2 is a partial perspective view of an embodiment of a circuit interrupter including a metal resistor having a positive temperature coefficient resistivity (a PTC element) according to the present invention.

FIG. 2 is a partial perspective view of an embodiment of a circuit interrupter 46 including a metal resistor having a positive temperature coefficient of resistivity (a PTC element) 48 according to the present invention. The circuit interrupter 46 is a medium to high voltage load circuit interrupter 46. The medium to high voltage loads include, for example, 1000 volt loads to 200 Kvolt loads. For each phase of the multiphase circuit interrupter 46, a main blade 22 (a main switch) having an open position and a closed position, and an arcing blade 24 (an arcing switch) having an open position and a closed position. All electrically live parts of the circuit interrupter 46 are mounted on insulators 26 attached to a grounded sheet metal 28 of an enclosure 30. A pull-bar 32 is connected to each main blade 22 for facilitating the operation of the main blade 22.

The circuit interrupter 46 breaks the flow of electrical current in a line (not shown this figure) having a load and a source wherein the circuit interrupter 46 is connected to a source terminal 36 for each phase and a load terminal 38 for each phase. The source terminal 36 and the load terminal 38 are shown having a number of holes or apertures for connecting the cables or wires from the line source and the line load, respectively. An arc chute 40 including an arc chute terminal 34 is connected to the insulator 26 for each phase. The entire arc chute 40 is illustrated only on one phase of the circuit interrupter 46 for simplicity. The arc chute 40 includes a channel in which the arcing blade 24 is positioned when the arcing blade 24 is in the closed position.

In the embodiment illustrated in FIG. 2, for each phase, a second terminal end 54 of the PTC element 48 is connected to the line at the source terminal 36 and a first terminal end 52 of the PTC element 48 is connected to the arc blade 24 through the arc chute terminal 34. In the prior art design of FIG. 1, the source terminal 36 and the arc chute terminal 34 are electrically connected. However, in the embodiment shown in FIG. 2 of the present invention, the source terminal 36 and the arc chute terminal 34 are connected electrically through the PTC element 48. If the PTC element 48 is not connected in the embodiment shown in FIG. 2, the source terminal 36 and the arc chute terminal 34 are electrically separated from each other. The operation of the circuit interrupter is further described in FIG. 7.

Figure 3:
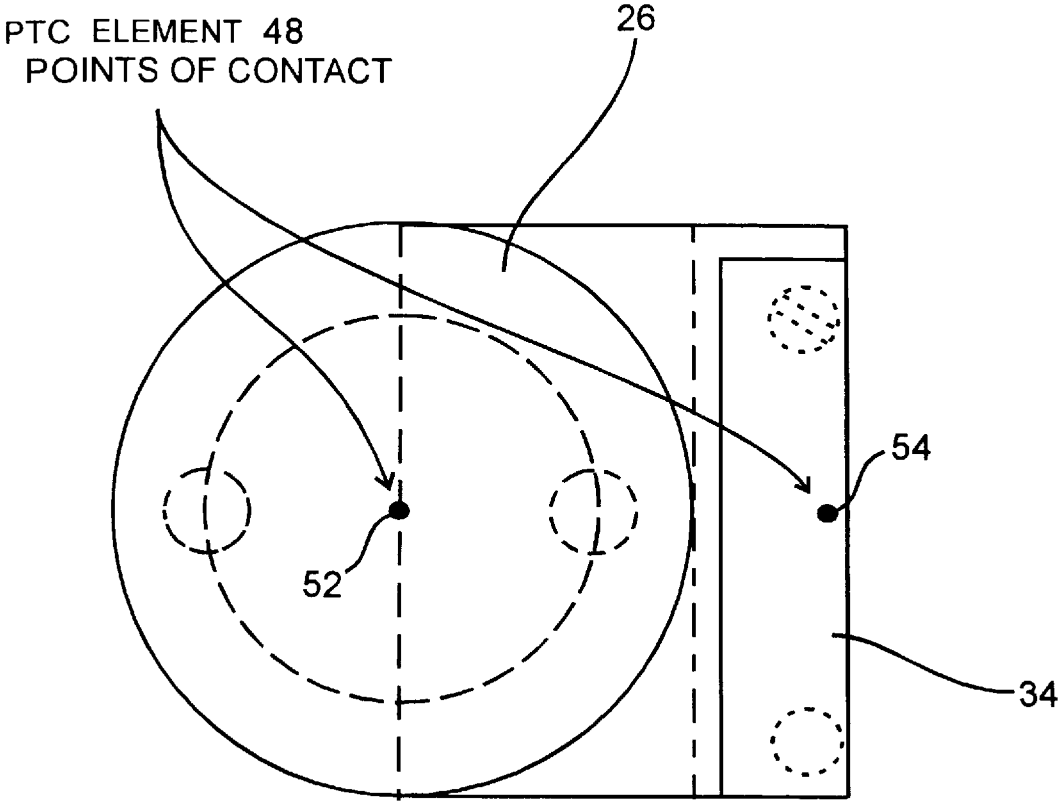
FIG. 3 is a cross-sectional view of an insulator having an embedded PTC element according to an embodiment of the present invention.

The PTC element 48 is positioned on the insulator 26. For example, the PTC element 48 has a serpentine shape and is wrapped circumferentially around the insulator 26 as shown in FIG. 2. Alternatively, the PTC element 48 is embedded within the insulator 26 as shown in FIG. 3 which is a cross-sectional view of an insulator 26 having an embedded PTC element 48 wherein the points of contact of the PTC element 48, the terminal ends 52 and 54, are shown on a section of the arc chute terminal 34 and within a section of the insulator 26 which is connected to the source terminal 36. The size of the insulator 26 will vary depending on the design of the PTC element 48 and the method of embedding the PTC element in the insulating material. The PTC element may be embedded in the insulator in a variety of ways for optimizing the packaging of the PTC element 48 in the insulating material.

In all embodiments, the PTC element as used in the present invention is, preferably, a pure metal, such as, pure tungsten or, for example, pure iron, pure tantalum or pure chromium. The use of a pure metal provides a higher positive temperature coefficient of resistivity, however, alternatively, certain metal alloys may also be used having a similar higher positive temperature coefficient of resistivity. The metal is preferably a wire, but may also include a foil or rod shape. Preferably, a pure tungsten wire having a diameter of between 1 and 10 millimeters (mm) and a length of between 0.3 and 10 meters is used in the circuit interrupter of the present invention. If the pure tungsten wire does not have a circular cross section, the preferred cross sectional area is between 0.78 and 78 $mm^2$. The PTC element 48 provides the circuit interrupter 46 of the present invention with a higher capacity than the prior art HVL circuit interrupter.

Figure 4:
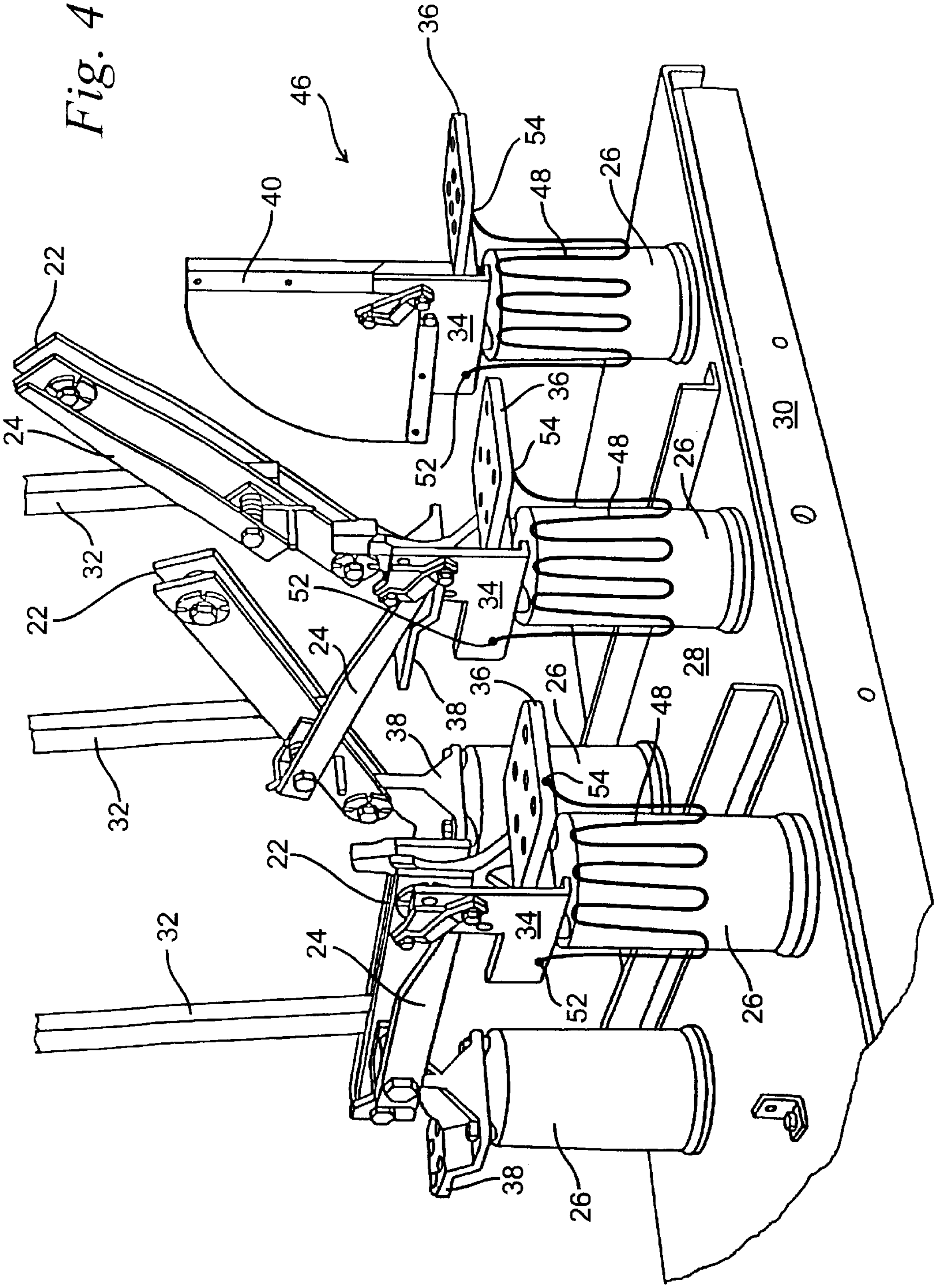
FIG. 4 is a partial perspective view illustrating an alternative embodiment for the shape of the PTC element shown in FIG. 2.

FIG. 4 illustrates another alternative embodiment wherein the PTC element 48 has a serpentine shape and is wrapped longitudinally around the insulator 26. Although preferred shapes of the PTC element 48 or wire resistor are illustrated, the PTC element 48 may include other shapes as long as the desired length and resistance amount is achieved for the PTC element 48. The distance (empty physical space) between the terminal ends 52 and 54, respectively, of the PTC element in FIG. 4 is larger than the distance between the terminal ends 52 and 54, respectively, shown in FIG. 2. The larger distance, or space, between the terminal ends 52 and 54 of the PTC element 48 provides an advantage including a higher dielectric strength between the terminal ends 52 and 54 of the PTC element 48. The voltage across the PTC element 48 can reach several thousand volts during an interruption. Therefore, it is necessary to allow a certain amount of optimized distance or space between the terminal ends 52 and 54 of the PTC element 48.

Figure 5:
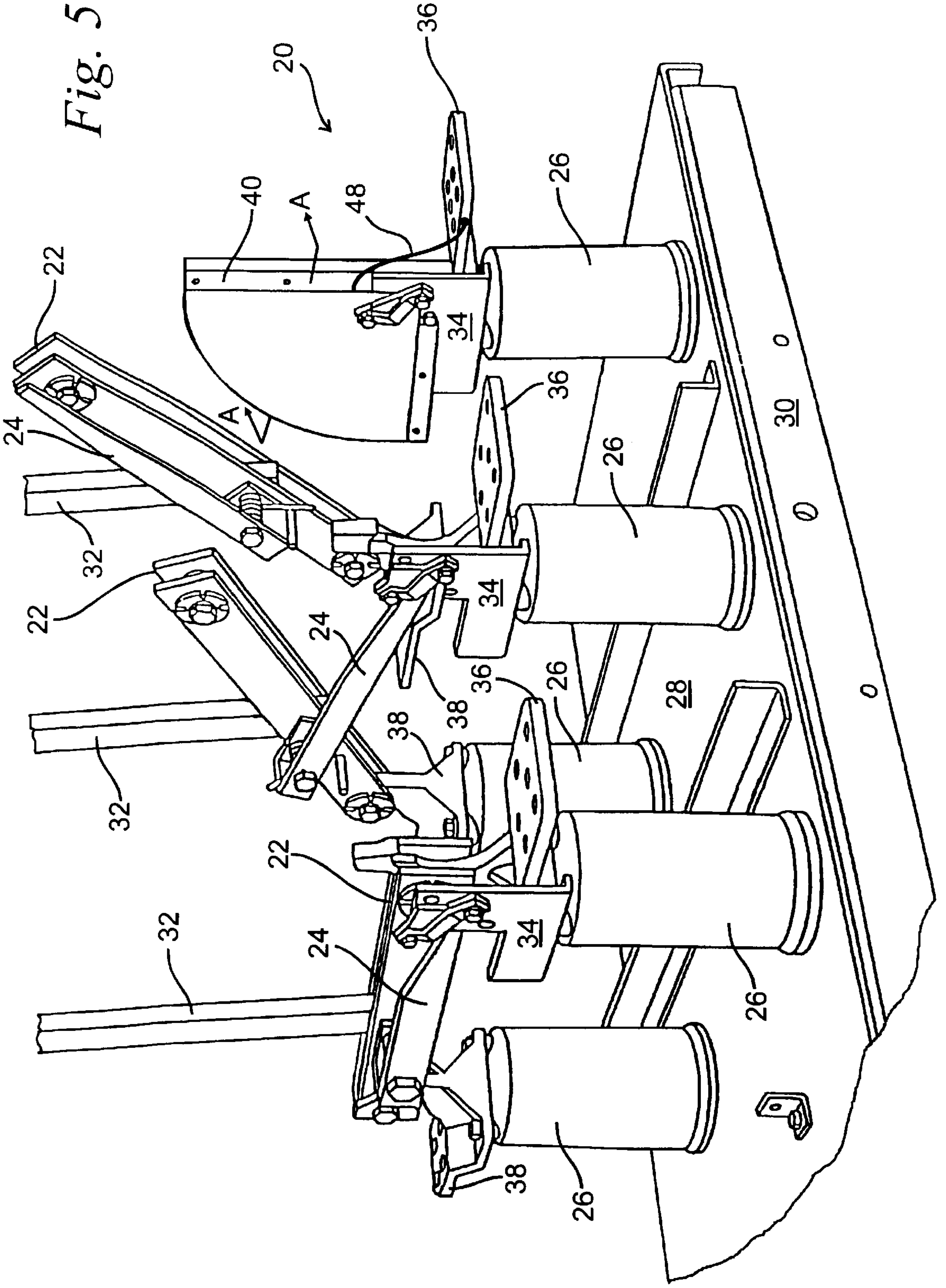
FIG. 5 is a partial perspective view of still another embodiment of a circuit interrupter including a PTC element wherein the PTC element is positioned within the arc chute.
Figure 6:
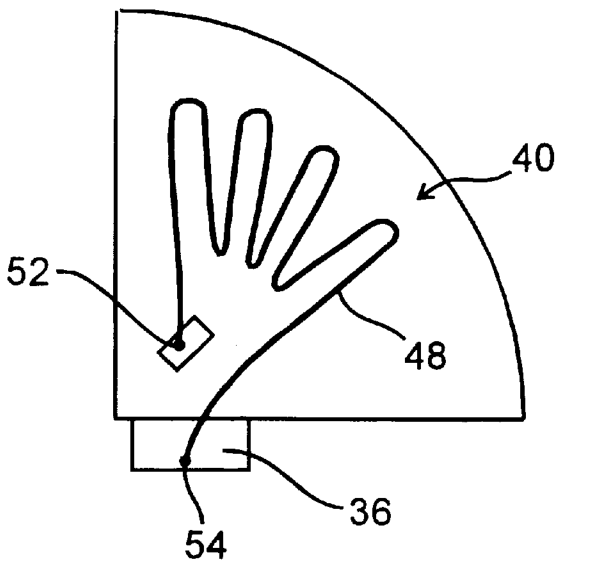
FIG. 6 is a cross-sectional view along lines A—A of FIG. 5 illustrating an embodiment of the PTC element positioned within the arc chute.

FIGS. 5 and 6 illustrate another embodiment of the present invention wherein the PTC element 48 has a serpentine shape and is positioned within the channel of the arc chute 40. One terminal end 54 of the PTC element 48 is connected to the source terminal 36 and another terminal end 52 of the PTC element 48 is connected to the arc chute terminal 34. When the PTC element 48 is positioned within the channel of the arc chute 40, a magnetic field is formed by the PTC element 48 and the current flowing through the PTC element 48. This allows the arc to "move" with the serpentine shaped PTC element 48 allowing for greater use of the arc chute 40 in extinguishing the arcing. In prior art circuit interrupters, the arcing would "burn" a path within the arc chute. Positioning the PTC element 48 within the arc chute 40 uses more of the arc chute to help reduce the temperature to more easily extinguish the arc.

Figure 7:
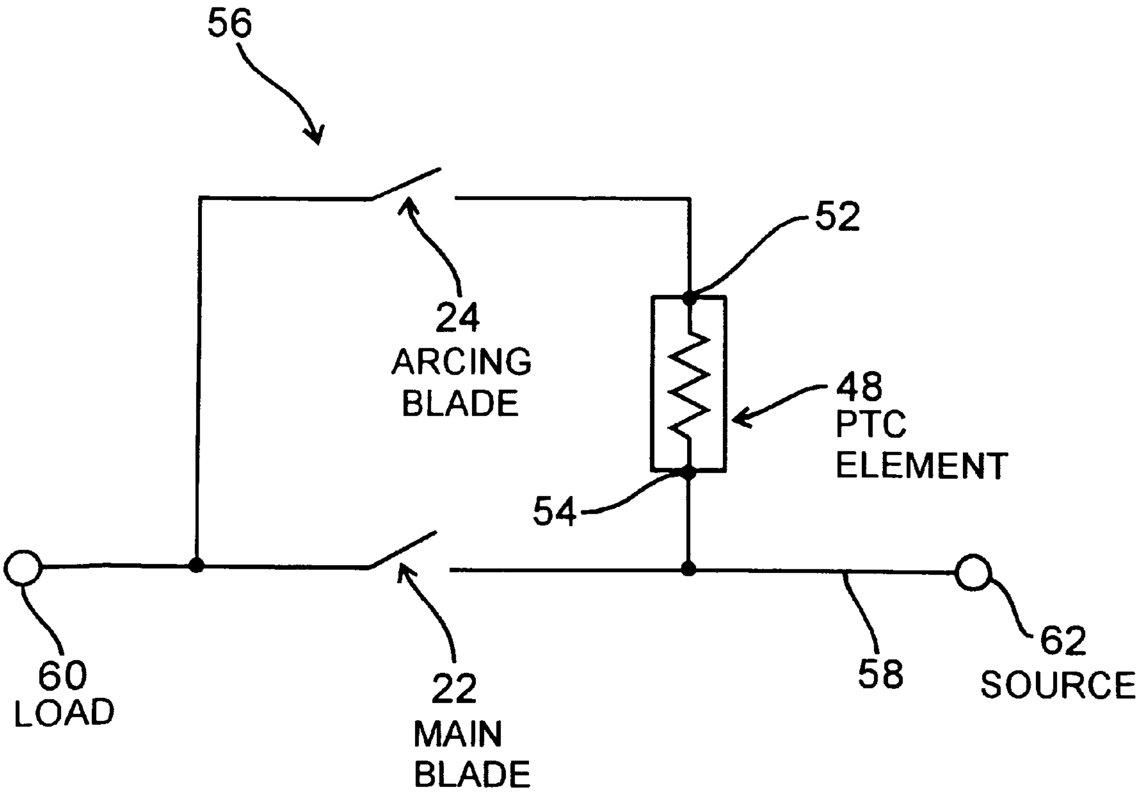
FIG. 7 is a schematic diagram illustrating one phase of the circuit of FIGS. 2, 4 and 6.

FIG. 7 is a schematic drawing illustrating one phase of the circuit interrupter of the embodiments of FIGS. 2, 4 and 6 including the main blade 22 and the arcing blade 24. For each phase, the main blade 22 (the main switch) has an open position and a closed position, and is connected in series with the line 58. For each phase, the arcing blade 24 (the arcing switch) has an open position and a closed position. The arcing blade 24 and the PTC element 48 are connected in series with each other and in parallel with the main blade 22. The circuit interrupter 56 breaks the flow of electrical current in the line 58 between the load 60 and the source 62. The circuit interrupter 56 is connected to the source 62 for each phase and the load 60 for each phase. In each of the embodiments of the present invention, the PTC element is connected to the arcing blade, either directly connected, or electrically connected to the arcing blade through the arc chute.

For each of the embodiments of the present invention, during a break in the flow of electrical current in the line, the main blade 22 is opened first, and the remaining let-through current passes through the arcing blade 24 and the PTC element 48 after the arc is extinguished between the main blade 22 contacts. The resistance of the PTC element 48 is increased to approximately 15 times its room temperature value after the PTC element 48 is heated by the current. The dimensions of the PTC element 48 are specifically designed for this purpose. The PTC element 48 limits the let-through current and dissipates most of the interruption energy. Because the resistance of the PTC element 48 adds to the original circuit resistance, the power factor of the circuit is increased after the main blade 22 is opened. This increase in power factor aids in reducing the interruption energy. The arcing blade 24 then opens and breaks the flow of electrical current in the line after the main blade 22 has opened and the interruption energy has reduced or dissipated. The circuit interrupter and method of the present invention allows the energy of breaking the flow of the electrical current to be split between the PTC element and the arc chute. The present invention increases the resistance of the circuit allowing for higher current breaks at all power factors.

Under normal operation, most of the current flows through the main blade 22. Since the cold resistance of the PTC element 48 (preferably a tungsten wire) is at least ten times larger than the main contact resistance, a small amount current is shunted through the PTC element 48. The PTC element 48 will not cause a temperature rise in the circuit interrupter.

Figure 8:
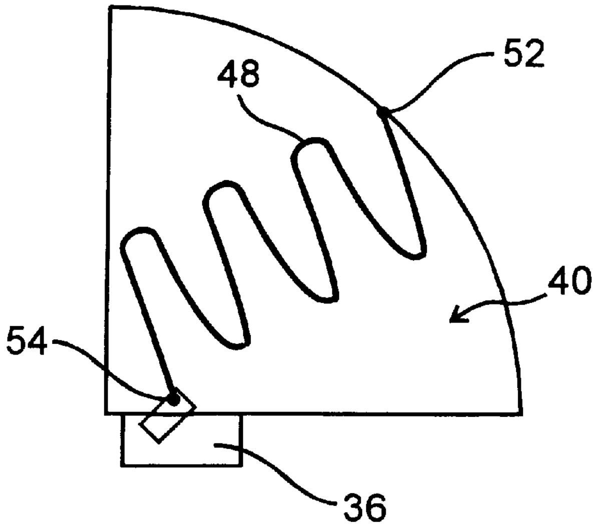
FIG. 8 is a cross-sectional view of an arc chute illustrating another embodiment of the PTC element positioned within the arc chute.
Figure 9:
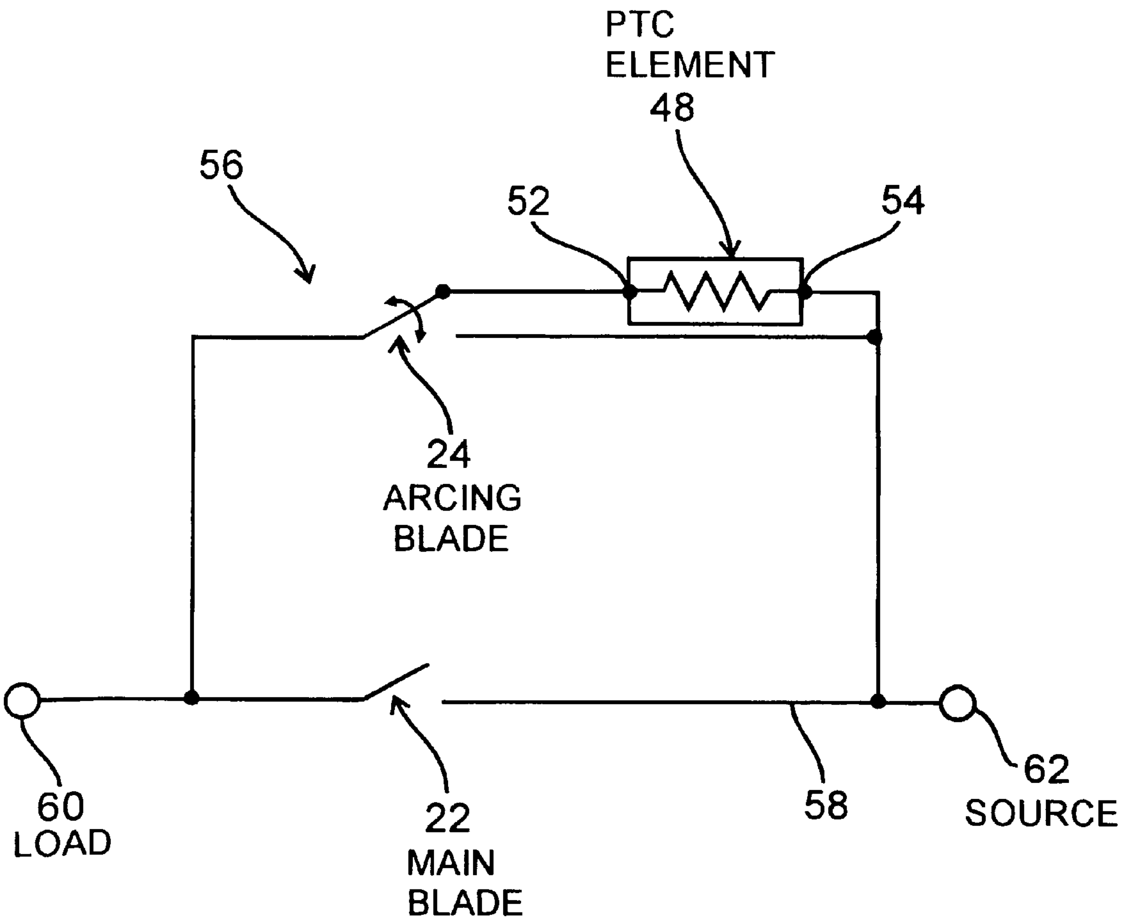
FIG. 9 is a schematic diagram illustrating one phase of the circuit of FIG. 8.

FIGS. 8 and 9 illustrate still another embodiment of the present invention wherein the PTC element 48 has a serpentine shape and is positioned within the channel of the arc chute 40. One terminal end 54 of the PTC element 48 is connected to both the source terminal 36 and the arc chute terminal 34. Another terminal end 52 of the PTC element 48 is connected to the arc chute 40, preferably at the outer edge of the arc chute 40. As described in FIGS. 5 and 6, positioning the PTC element 48 within the channel of the arc chute 40 forms a magnetic field allowing the arc to "move" with the PTC element 48 allowing for greater use of the arc chute 40 in extinguishing the arcing and reducing the "burning" of a path by the arc.

Figure 10:
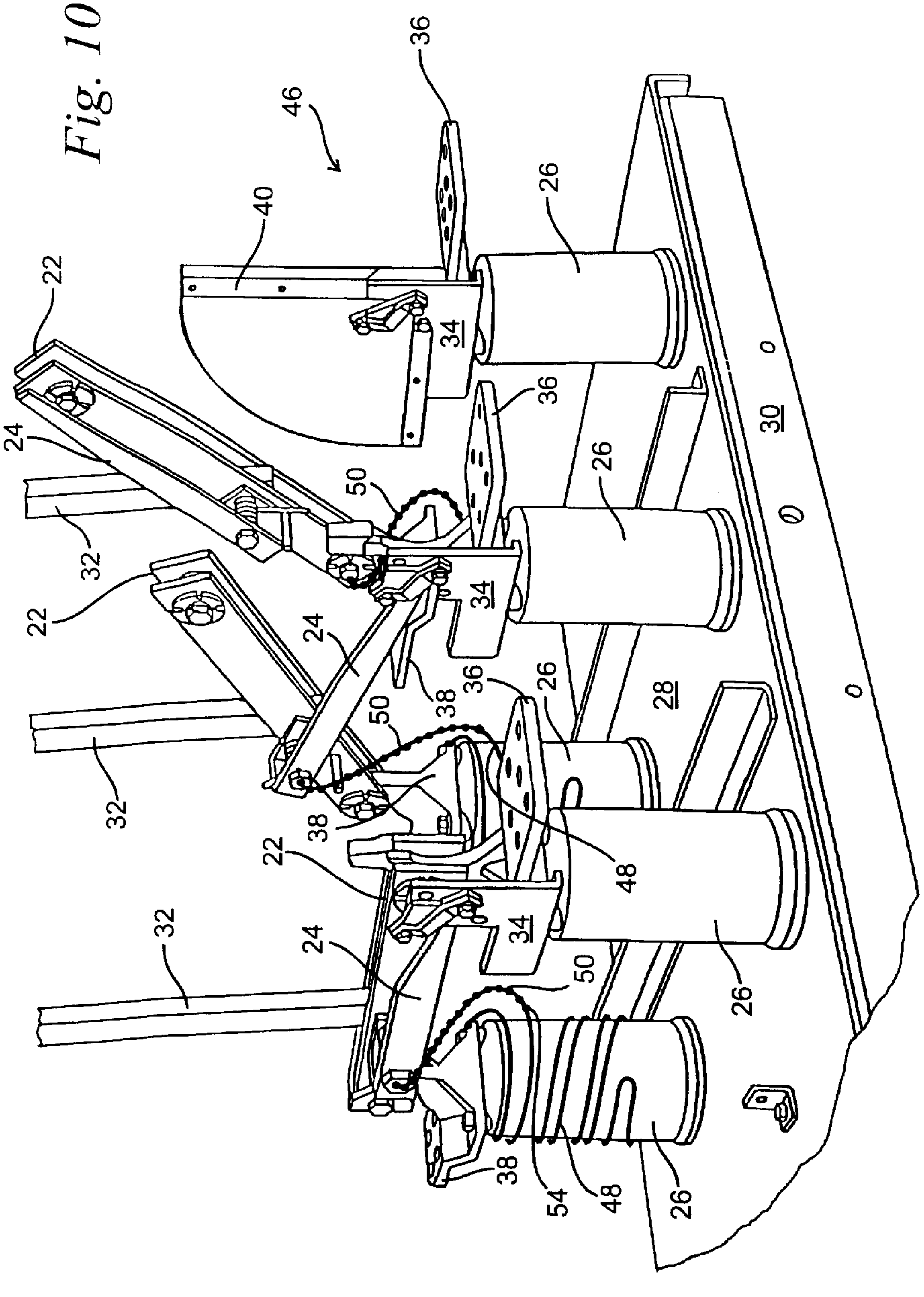
FIG. 10 is a partial perspective view of another embodiment of a circuit interrupter including a metal PTC element wherein the PTC element is connected to the load terminal.
Figure 11:
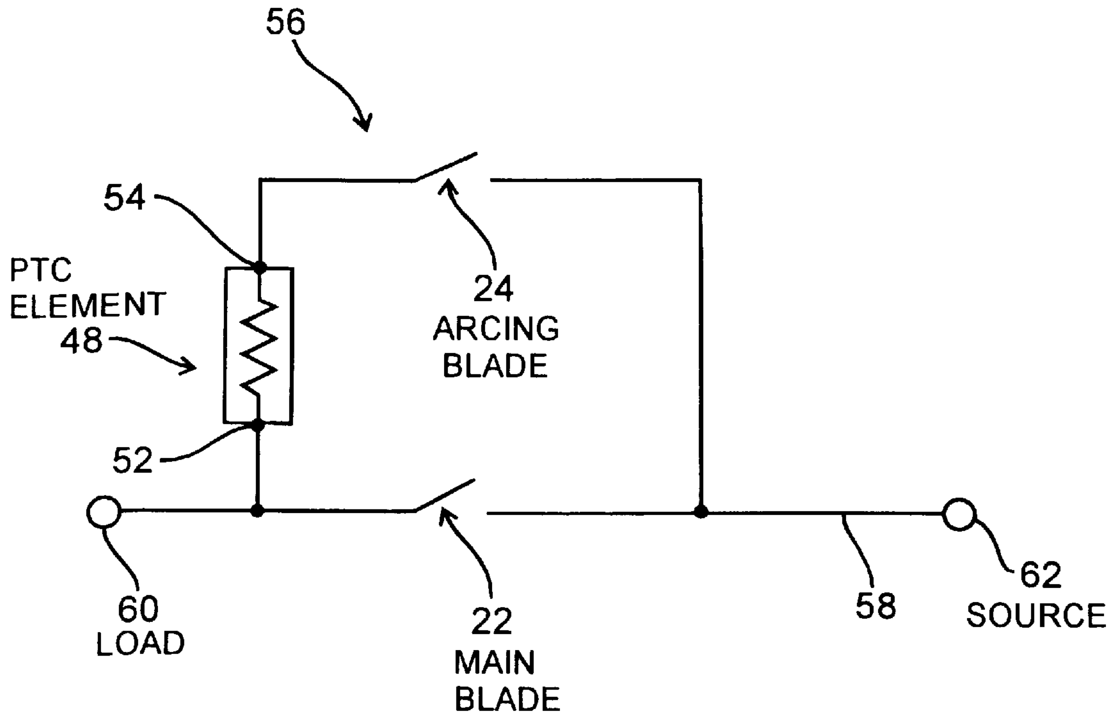
FIG. 11 is a schematic diagram illustrating one phase of the circuit of FIG. 10.

FIGS. 10 and 11 illustrate an alternative embodiment of the circuit interrupter 46 of the present invention wherein the PTC element 48 is embedded in the insulator 26 and connected to the load side instead of the source side as shown in FIG. 2. For instance, one terminal end 52 of the PTC element 48 is connected to the line at the load terminal 38 and to a flexible connector 50, which is connected to the arcing blade 24. In the embodiment shown in FIG. 10 of the present invention, the main blade 22, and the arcing blade 24 are electrically connected through the PTC element 48. Without the PTC element 48, the main blade 22, and the arcing blade 24 are electrically separated by insulating washers and tubes (not shown). FIG. 11 is a schematic drawing illustrating one phase of the circuit interrupter of the embodiment of FIG. 10 including the main blade 22 (the main switch) and the arcing blade 24 (the arcing switch). The arcing blade 24 and the PTC element 48 are connected in series with each other and in parallel with the main blade 22. The circuit interrupter 56 breaks the flow of electrical current in the line 58 between the load 60 and the source 62.

Figure 12:
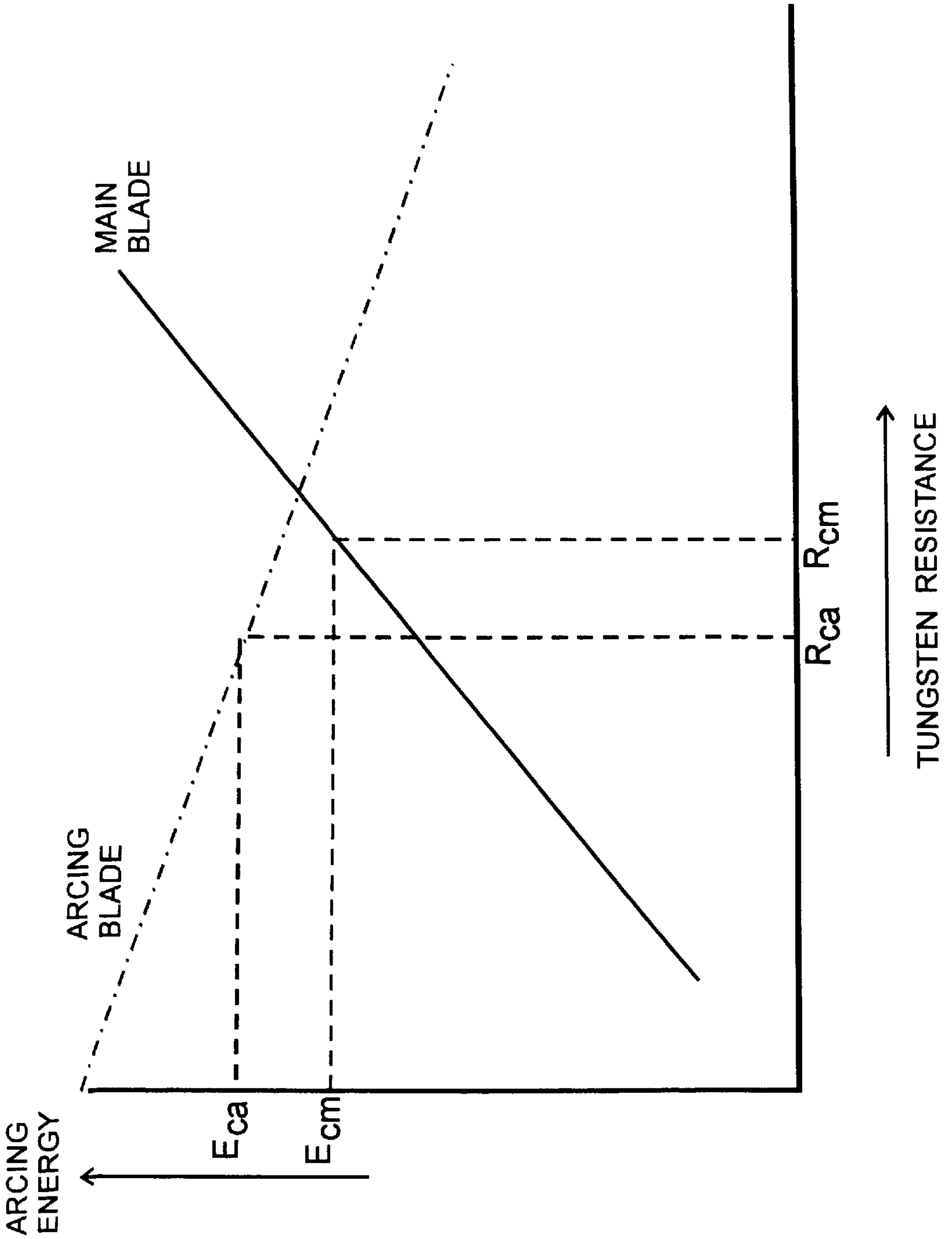
FIG. 12 is a chart illustrating the relationship between arcing energy and the resistance of a cold PTC element as used in the present invention.

FIG. 12 illustrates the relationship between the arcing energy and the cold PTC element resistance during a break in the flow of electrical current at a specific breaking rating for the circuit interrupter of the present invention. When the PTC element 48 is connected in parallel with the main blade 22, the energy consumed by the main blade 22 arcing increases as the PTC element 48 resistance increases. However, the energy consumed by the arcing blade 24 arcing decreases as the PTC element 48 resistance increases. If the main blade 22 arcing energy exceeds a value, $E_{cm}$, the main blade 22 erodes to a degree beyond acceptable standards, and if the arcing blade 24 arcing energy exceeds a value, $E_{ca}$, the arcing blade 24 erodes to a degree beyond acceptable standards. In FIG. 12, the corresponding PTC element 48 resistance values to the values $E_{cm}$ and $E_{ca}$ are values $R_{cm}$ and $R_{ca}$, respectively. Therefore, the cold PTC element 48 resistance is preferably between values $R_{cm}$ and $R_{ca}$. The optimal design reduces the gap between values $E_{cm}$ and $E_{ca}$ to its narrowest.

An advantage of the circuit interrupter of the present invention is to increase the power factor of a circuit by adding the PTC element resistance, such that the interruption of the circuit is easier. The present invention, therefore, increases the electrical current breaking capacity of the medium to high voltage load circuit interrupters. Another advantage of the present invention is to convert most of the breaking energy into heat of the PTC elements instead of generating arcing and pressure during a break in the flow of electrical current. Approximately 100% interruption energy goes to arcing in an existing HVL switch. In existing medium to high voltage circuit interrupters or switches, gases with high dielectric properties such as $SF_6$ gases and a vacuum means are used to suppress the arcing because most of the breaking energy is consumed by arcing. In the present invention, very little energy will go into arcing, therefore, the $SF_6$ gases and vacuum means are not necessary in the present invention which allows for the use of air circuit interrupters.

While preferred embodiments have been shown and described, various modifications and substitutions may be made thereto without departing from the spirit and scope of the invention. Accordingly it is to be understood that the present invention has been described by way of illustrations and not limitations. It is intended that all variations within the scope and spirit of the appended claims be embraced by the foregoing disclosure.

What is claimed is:

1. A circuit interrupter for breaking the flow of electric current in a line having a load and a source wherein the circuit interrupter is a medium to high voltage circuit interrupter comprising:

a main switch connected in series with the line and having an open and a closed position;

an arcing switch, having an open and a closed position;

an arc chute having a channel and electrically coupled to the arcing switch wherein the arcing switch is positioned within said channel when the arcing switch is in the closed position;

a metal resistor having a positive temperature coefficient of resistivity connected in series with the arcing switch wherein the metal resistor and arcing switch are connected in parallel with the main switch; and wherein the main switch moves from the closed position to the open position prior to the arcing switch moving from the closed position to the open position.

2. A circuit interrupter, as recited in claim 1, wherein the metal resistor is connected to a source terminal and to the arcing switch through the arc chute.

3. A circuit interrupter, as recited in claim 1, further comprising:

a flexible connector connected to the arcing switch; and wherein the metal resistor is connected to a load terminal and to the arcing switch through the flexible connector.

4. A circuit interrupter, as recited in claim 1, further comprising:

an insulator positioned between a ground and the main switch and the arcing switch wherein the metal resistor is positioned on said insulator.

5. A circuit interrupter, as recited in claim 4, wherein the metal resistor has a serpentine shape and is embedded within the insulator.

6. A circuit interrupter, as recited in claim 4, wherein the metal resistor has a serpentine shape and is wrapped circumferentially around the insulator.

7. A circuit interrupter, as recited in claim 4, wherein the metal resistor has a serpentine shape and is wrapped longitudinally around the insulator.

8. A circuit interrupter, as recited in claim 1, wherein the metal resistor is positioned on the arc chute within the channel.

9. A circuit interrupter, as recited in claim 8, wherein a first terminal end of the metal resistor is connected to a source terminal and a second terminal end of the metal resistor is connected to the arcing switch.

10. A circuit interrupter, as recited in claim 8, wherein a first terminal end of the metal resistor is connected to both a source terminal and the arcing switch and a second terminal end of the metal resistor is connected to the arc chute.

11. A circuit interrupter, as recited in claim 8, wherein the metal resistor has a serpentine shape.

12. A circuit interrupter, as recited in claim 1, wherein the metal resistor is comprised of a pure metal from a group comprising pure tungsten, iron, tantalum and chromium.

13. A circuit interrupter, as recited in claim 1, wherein the metal resistor is a metal wire.

14. A circuit interrupter, as recited in claim 1, wherein the metal resistor is a metal rod.

15. A circuit interrupter, as recited in claim 1, wherein the metal resistor is a metal foil.

16. A method for breaking the flow of electric current in a line having a load and a source wherein the load is a medium to high voltage load, the method comprising:

connecting a main switch to a load terminal and a source terminal in series with the line, the main switch having an open and a closed position;

connecting a metal resistor having a positive temperature coefficient of resistivity to the main switch;

connecting an arcing switch, having an open and a closed position, in series with the metal resistor and wherein the metal resistor and arcing switch are connected in parallel with the main switch;

electrically coupling an arc chute having a channel to the arcing switch wherein the arcing switch is positioned within said channel when the arcing switch is in a closed position; and wherein the main switch moves from the closed position to the open position prior to the arcing switch moving from the closed position to the open position.

17. A method, as recited in claim 16, further comprising:

connecting the metal resistor to the source terminal and to the arcing switch through the arc chute.

18. A method, as recited in claim 16, further comprising:

connecting a flexible connector to the arcing switch; and connecting the metal resistor to the load terminal and to the arcing switch through the flexible connector.

19. A method, as recited in claim 16, further comprising:

positioning an insulator between a ground and the main switch and the arcing switch; and positioning the metal resistor on said insulator.

20. A method, as recited in claim 19, wherein the metal resistor has a serpentine shape and further comprising:

embedding the metal resistor within the insulator.

21. A method, as recited in claim 19, wherein the metal resistor has a serpentine shape and further comprising:

wrapping the metal resistor circumferentially around the insulator.

22. A method, as recited in claim 19, wherein the metal resistor has a serpentine shape and further comprising:

wrapping the metal resistor longitudinally around the insulator.

23. A method, as recited in claim 16, further comprising:

positioning the metal resistor on the arc chute within the channel.

24. A method, as recited in claim 23, further comprising:

connecting a first terminal end of the metal resistor to a source terminal; and connecting a second terminal end of the metal resistor to the arcing switch.

25. A method, as recited in claim 23, further comprising:

connecting a first terminal end of the metal resistor to both a source terminal and the arcing switch; and connecting a second terminal end of the metal resistor to the arc chute.

26. A method, as recited in claim 23, wherein the metal resistor has a serpentine shape.

27. A method, as recited in claim 16, wherein the metal resistor is comprised of a pure metal from a group comprising pure tungsten, iron, tantalum and chromium.

28. A method, as recited in claim 16, wherein the metal resistor is a metal wire.

29. A method, as recited in claim 16, wherein the metal resistor is a metal rod.

30. A method, as recited in claim 16, wherein the metal resistor is a metal foil.

* * * * *